United States Patent
Lapp et al.

(10) Patent No.: US 10,408,268 B2
(45) Date of Patent: Sep. 10, 2019

(54) METHOD OF USING PRESSURE NITRIDED STAINLESS STEEL HYBRID BEARING WITH A REFRIGERANT LUBRICATED COMPRESSOR

(71) Applicant: TRANE INTERNATIONAL INC., Piscataway, NJ (US)

(72) Inventors: William E. Lapp, La Crosse, WI (US); Todd W. Smith, Onalaska, WI (US); Arthur L. Butterworth, La Crosse, WI (US); Paul J. Sikorsky, Sparta, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 546 days.

(21) Appl. No.: 14/763,213

(22) PCT Filed: Jan. 24, 2014

(86) PCT No.: PCT/US2014/013037
§ 371 (c)(1),
(2) Date: Jul. 24, 2015

(87) PCT Pub. No.: WO2014/117011
PCT Pub. Date: Jul. 31, 2014

(65) Prior Publication Data
US 2016/0010691 A1 Jan. 14, 2016

Related U.S. Application Data

(60) Provisional application No. 61/756,756, filed on Jan. 25, 2013.

(51) Int. Cl.
*F16C 33/62* (2006.01)
*F04D 29/046* (2006.01)
(Continued)

(52) U.S. Cl.
CPC .......... *F16C 33/62* (2013.01); *F04D 25/0626* (2013.01); *F04D 29/046* (2013.01);
(Continued)

(58) Field of Classification Search
None
See application file for complete search history.

(56) References Cited

U.S. PATENT DOCUMENTS 3,178,324 A * 4/1965 Grange ................. C21D 1/785
148/662
5,593,234 A 1/1997 Liston
(Continued)

FOREIGN PATENT DOCUMENTS

CN 1322289 A 11/2001
CN 1373836 A 10/2002
(Continued)

OTHER PUBLICATIONS

Machine-English translation of JP 2010-024486, Narita Shuji et al., Feb. 4, 2010.*
(Continued)

*Primary Examiner* — Matthew E. Hoban
*Assistant Examiner* — Anthony M Liang
(74) *Attorney, Agent, or Firm* — Hamre, Schumann, Mueller & Larson, P.C.

(57) ABSTRACT

A pressure nitrided stainless steel hybrid ball bearing having an inner ring, an outer ring, and rolling elements disposed therebetween. The pressure nitrided stainless steel hybrid bearing has one or more component(s) made from a pressure nitrided stainless steel material. The pressure nitrided stainless steel hybrid bearing used with a refrigerant lubrication for chiller applications leads to a very long useful life time.

11 Claims, 2 Drawing Sheets

(51) Int. Cl.
  F04D 29/059 (2006.01)
  F04D 25/06 (2006.01)
  F16C 33/30 (2006.01)
  F04D 17/12 (2006.01)
(52) U.S. Cl.
  CPC .......... *F04D 29/059* (2013.01); *F16C 33/303* (2013.01); *F04D 17/122* (2013.01); *F05D 2240/54* (2013.01); *F05D 2300/11* (2013.01); *F05D 2300/228* (2013.01); *F05D 2300/611* (2013.01)

(56) References Cited

U.S. PATENT DOCUMENTS

| | | | |
|---|---|---|---|
| 5,725,688 A † | 3/1998 | Sugi | |
| 6,143,425 A | 11/2000 | Tanaka et al. | |
| 6,176,092 B1 † | 1/2001 | Butterworth | |
| 6,279,340 B1 | 8/2001 | Butterworth et al. | |
| 6,422,756 B1 | 7/2002 | Tanaka et al. | |
| 6,517,249 B1 | 2/2003 | Doll | |
| 6,564,560 B2 | 5/2003 | Butterworth et al. | |
| 6,575,631 B2 | 6/2003 | Shoda et al. | |
| 7,847,454 B2 | 12/2010 | Weeber et al. | |
| 8,070,364 B2 | 12/2011 | Beer et al. | |
| 8,847,450 B2 | 9/2014 | Weeber et al. | |
| 8,875,380 B2 | 11/2014 | Weeber et al. | |
| 10,000,830 B2 * | 6/2018 | Abe | C22C 38/50 |
| 2002/0048529 A1 | 5/2002 | Kucharczyk et al. | |
| 2002/0104213 A1 | 8/2002 | Schneider et al. | |
| 2002/0168125 A1 | 11/2002 | Kahlman et al. | |
| 2007/0201995 A1 | 8/2007 | Harstad et al. | |
| 2007/0292066 A1 † | 12/2007 | Kahlman | |
| 2008/0218008 A1 | 9/2008 | Ghasripoor et al. | |
| 2008/0218015 A1 | 9/2008 | Weeber et al. | |
| 2008/0219834 A1 † | 9/2008 | Merfeld | |
| 2009/0113999 A1 | 5/2009 | Gerstler et al. | |
| 2010/0043631 A1 | 2/2010 | Hamlin et al. | |
| 2011/0023288 A1 | 2/2011 | Weeber et al. | |
| 2011/0043063 A1 | 2/2011 | Weeber et al. | |
| 2011/0049109 A1 * | 3/2011 | Weeber | C22C 19/055 219/75 |
| 2012/0037278 A1 | 2/2012 | Beer et al. | |

FOREIGN PATENT DOCUMENTS

| | | |
|---|---|---|
| EP | 1098098 | 5/2001 |
| EP | 1967286 B1 | 5/2014 |
| EP | 2872787 | 5/2015 |
| GB | 2514271 | 11/2014 |
| WO | 2014/012748 | 1/2014 |

OTHER PUBLICATIONS

International search report for International application No. PCT/US2014/013037, dated May 20, 2014 (3 pages).

Written opinion for International application No. PCT/US2014/013037, dated May 20, 2014 (6 pages).

"Extend bearing service life with NitroMax the high-nitrogen steel for super-precision angular contact ball bearings", PUB BU/P9 10126 EN, Sep. 2009 (5 pages).

"S-Series EarthWise™ CentraVac™ Chiller oil-free, high-efficiency, low-emission technology for sustainable performance", CTV-SLB014-EN, Feb. 2002 (12 pages).

Examination Report; GB Application No. 1514748.1, dated Dec. 4, 2018 (5 pages).

Radu, "It's All about the Steel: the Importance of Bearing Steel Cleanliness for Long-Life Applications", RKB Technical Review, available online at: http://pdfdirectmdustry.com/pdf/rkb-europe/its-all-about-steel-importance-bearing-steelcleanliness-long-life-applications/27918-169799.htm, Mar. 2011 (8 pages).

Duetsche Edelstahlwerke, "Remelting for highest standards", available online at: https://www.dew-stahl.com/fileadmin/files/dewstahl.com/documents/Publikationen/Broschueien/059_DEW_Umschmelzen_GB.pdf, Mar. 2011 :12 pages).

Wegman et al., "An Introduction to Premium Melting", Cartpenter, available online at: https://www.cartech.com/globalassets/literaturefiles/carpenterintrotopremiummelting_whitepaper.pdf, Jun. 2009 (8 pages).

Herring, "Grain Size and It's Influence on Materials Properties", The Heat Treat Doctor, available online at: http://www.heat-treat-doctor.com/documents/gramsize.pdf, Aug. 2005 (2 pages).

\* cited by examiner
† cited by third party

METHOD OF USING PRESSURE NITRIDED STAINLESS STEEL HYBRID BEARING WITH A REFRIGERANT LUBRICATED COMPRESSOR

FIELD

The embodiments disclosed herein relate to a ball bearing that is used with refrigerant lubrication for chiller applications. The embodiments disclosed herein relate to a compressor having a ball bearing that is lubricated with a refrigerant. The embodiments disclosed herein relate to an oil-free compressor in which a ball bearing of the oil-free compressor is lubricated by a refrigerant, and not lubricated with oil.

BACKGROUND

A ball bearing has an inner ring, an outer ring, and rolling elements disposed therebetween. A hybrid bearing is a ball bearing having two or more different materials. For example, a hybrid bearing can have rolling elements made of one material, and one or both of the inner and outer rings made from another material.

SUMMARY

Generally, a ball bearing used with refrigerant lubrication for chiller applications, e.g. a centrifugal chiller, means that the ball bearing is not lubricated with oil, but instead, the ball bearing is lubricated with a refrigerant. An embodiment of a pressure nitrided stainless steel hybrid bearing has components made from a pressure nitrided stainless steel material. The pressure nitrided stainless steel hybrid bearing used with refrigerant lubrication for chiller applications leads to a useful lifetime that is longer than a useful life time of a standard steel ball bearing. Accordingly, a compressor and/or other parts of the chiller application having the pressure nitrided stainless steel hybrid bearing has longer useful lifetime and/or requires less frequent services due to a worn and/or broken bearing.

Examples of a compressor include, but are not limited by, a centrifugal compressor. A centrifugal compressor rotates one or more impellers in a volute housing to compress a refrigerant gas for use in the chiller's refrigeration circuit. The impeller or impellers of a centrifugal compressor can weigh hundreds if not thousands of pounds. The high speed rotation of physically large and heavy chiller components at several thousand RPM results in unique and challenging bearing lubrication issues, particularly at start-up when these components are at rest, but also during chiller shutdown when these components coast to a stop.

A centrifugal compressor can be a direct drive type or gear drive type. A chiller is referred to as direct drive chiller or gear drive chiller, depending on the type of the compressor that is included in the chiller. That is, the direct drive chiller is a chiller which includes a direct drive type compressor, and the gear drive chiller is a chiller which includes a gear drive type compressor. In direct drive chillers, the rotor of the compressor's drive motor is mounted directly to the shaft on which the compressor's one or more impellers are mounted. That shaft, in turn, is typically mounted for rotation in one or more bearings which are in need of lubrication when the chiller is in operation. In gear drive centrifugal chillers the shaft on which the one or more impellers are mounted is driven through a series of gears rather than by the direct mounting of the rotor of the compressor drive motor to the shaft on which the impellers are mounted. The gears of a gear drive chiller act to increase the speed of rotation of the impeller beyond that of the motor which drives the impeller and in so doing increase the refrigeration effect or capacity of the chiller. In the case of a gear drive chiller, both the drive gears and the bearings in which the impeller shaft rotates require lubrication, heretofore by oil, and both direct drive and gear drive chillers have most typically employed induction motors, the speeds of which can be 3600 RPM.

In the cases of both direct drive and gear drive large tonnage centrifugal chillers, lubrication of their rotating components has historically proven both challenging and expensive and has been exclusively or at least fundamentally accomplished by the use of oil as the lubricant. The need for such lubrication systems has vastly complicated the design, manufacture, operation, maintenance and control of centrifugal chillers of both the direct drive and gear drive type and has added great initial and operational cost to them. Elimination of oil as a lubricant in a large tonnage centrifugal refrigeration chiller system and the use of the refrigerant which comprises the chiller's working fluid for that purpose offers potentially tremendous advantages. Among those advantages are: elimination of many chiller failure modes associated with oil-based chiller lubrication systems; elimination of so-called oil migration problems associated with the mixing of oil and refrigerant in such chiller systems; enhancement of overall system efficiency by eliminating the oil-coating of heat exchange surfaces that results from the entrainment of oil in system refrigerant and the carrying of that entrained oil into a chiller's heat exchangers; elimination of what is viewed as an environmentally unfriendly material (oil) from the chiller system as well as the problems and costs associated with the handling and disposal thereof; and, elimination of a great number of expensive and relatively complex components associated with chiller lubrication systems as well as the control and maintenance costs associated therewith.

Further, the elimination of oil as a lubricant in a centrifugal chiller system suggests the possibility of a centrifugal chiller that offers the advantages of direct drive machines yet which, by virtue of variable speed operation, is fully the equal of or superior to gear drive machines. Heretofore, particularly good part load efficiencies have been achieved in gear drive machines by the use of specially configured gear sets capable of driving a chiller's impeller at relatively very high and/or optimal speeds. As was noted earlier, however, gear drive machines do not offer many of the advantages of direct drive machines and their use brings several distinct disadvantages, the need for an oil-based lubrication system for the purpose of ensuring the adequate lubrication of the gear train being one of them.

ASTM E112 and ASTM A295 are standards and test methods provided by ASTM International, formerly known as the American Society for Testing and Materials (ASTM). Methodology for determining the grain size number classification is determined by a visual comparison to a standard chart provided by ASTM International. ASTM E112 used herein includes ASTM E112 Plate III-08 (2008 revision). ASTM A295 used herein includes ASTM A295/A295M-09 (2009 revision) and ASTM E112-12 (2012 revision). The ASTM standards are convertible to physical properties, such as dimensions, of materials (e.g., grain size).

An embodiment of a pressure nitrided stainless steel hybrid bearing includes a race made from a pressure nitrided stainless steel having an ASTM E112 (e.g., ASTM E112-12) grain size number range having a value of equal to or greater than 10.

An embodiment of a pressure nitrided stainless steel hybrid bearing includes a race made from a pressure nitrided stainless steel having an ASTM A295 (e.g., ASTM A295/A295M-09 or ASTM E112-12) inclusion rating for sulfide of equal to or less than ½.

An embodiment of a pressure nitrided stainless steel hybrid bearing includes a race made from a pressure nitrided stainless steel having an ASTM A295 (e.g., ASTM A295/A295M-09 or ASTM E112-12) inclusion rating for alumina of equal to or less than ½.

An embodiment of a pressure nitrided stainless steel hybrid bearing includes a race made from a pressure nitrided stainless steel having an ASTM A295 (e.g., ASTM A295/A295M-09 or ASTM E112-12) inclusion rating for silicate of equal to or less than ½.

An embodiment of a pressure nitrided stainless steel hybrid bearing includes a race made from a pressure nitrided stainless steel having an ASTM A295 (e.g., ASTM A295/A295M-09 or ASTM E112-12) inclusion rating for globular oxide of equal to or less than ½.

An embodiment of a pressure nitrided stainless steel hybrid bearing can also include the pressure nitrided stainless steel having nitrogen concentration range of equal to or greater than 0.3%, carbon concentration range of 0.10-0.60%, and chromium concentration range of 10-18%.

An embodiment of a pressure nitrided stainless steel hybrid bearing can also include the pressure nitrided stainless steel having nitrogen concentration range of greater than 0.1%, carbon concentration range of 0.10-0.60%, and chromium concentration range of 12-18%.

An embodiment of a compressor for a chiller application includes any of the embodiments of the pressure nitrided stainless steel hybrid bearings described herein.

DETAILED DESCRIPTION

A chiller includes a compressor, a condenser, and an evaporator. Refrigerant gas is compressed within the compressor. Compressed refrigerant is directed out of discharge, e.g., a volute, into a piping which connects the compressor to the condenser. The condenser is cooled by a liquid which enters the condenser through an inlet and exits through an outlet. The liquid for cooling the condenser can be water. The liquid passes to, through and back from a cooling tower, exits the condenser after having been heated in a heat exchange relationship with a hot, compressed system refrigerant directed out of the compressor into the condenser in a gaseous state.

The heat exchange process occurring within the condenser causes the relatively hot, compressed refrigerant gas delivered thereinto to condense and pool as a relatively much cooler liquid in the bottom of the condenser. The condensed refrigerant is then directed out of the condenser to an expansion device, e.g., a metering device. The refrigerant passes through the metering device and is reduced in pressure and cooled by the process of expansion. The cooled refrigerant is then delivered, primarily in liquid form, into the evaporator.

Refrigerant passing into and through evaporator undergoes a heat exchange relationship with a medium, such as water, which enters the evaporator through its own inlet and exits the evaporator though its own exit. In the process of cooling the medium which flows through the evaporator and being heated thereby, the refrigerant vaporizes and is directed as a relatively low pressure but still warm gas, through a piping back to the compressor. The refrigerant is then compressed again by the compressor and heated in an ongoing and repetitive process.

Figure 1A:
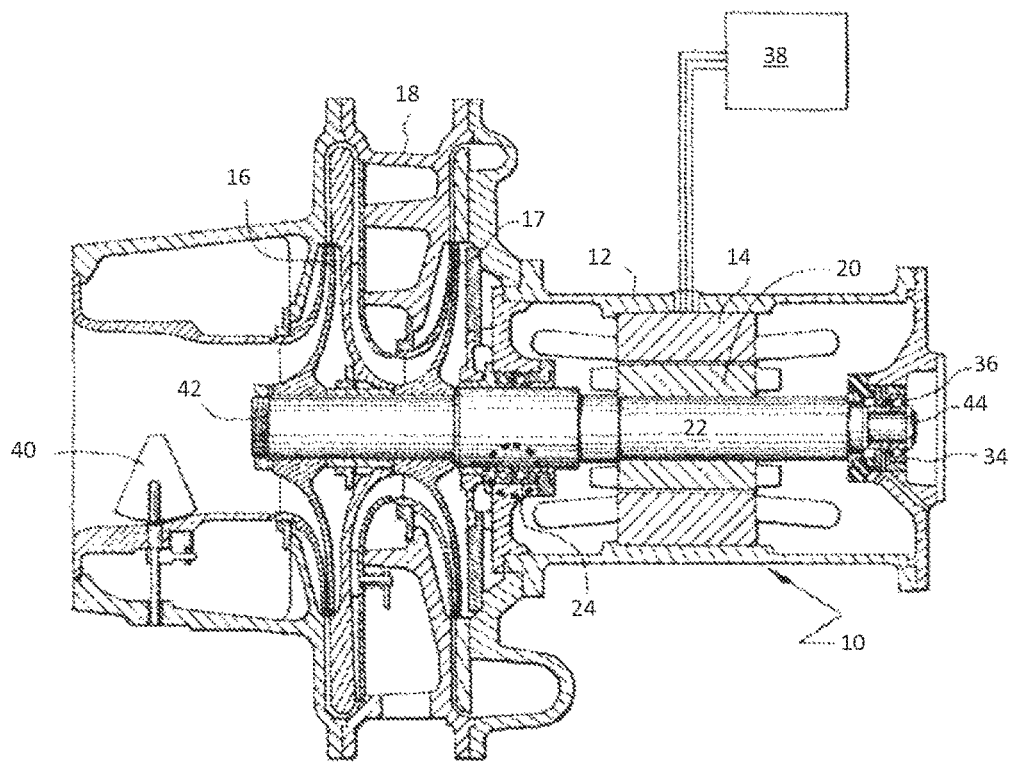
FIG. 1A shows a schematic diagram of an embodiment of a compressor for a chiller, wherein the compressor has a pressure nitrided stainless steel hybrid bearing.

FIG. 1A shows a schematic view of an embodiment of a compressor 10 of a chiller. The compressor 10 includes a housing 12 in which chiller drive motor 14 is disposed. Impellers 16 and 17 are disposed in volute housing 18 and are, together with rotor 20 of drive motor 14, mounted for rotation on shaft 22. Shaft 22, in turn, is mounted for rotation in a bearing package 24, which includes one or more pressure nitrided stainless steel hybrid bearings, and another pressure nitrided stainless steel hybrid bearing 34. It is to be noted that although the illustrated embodiment is a preferred embodiment of a centrifugal chiller, chillers driven by other than centrifugal compressors fall within its scope. In such cases, the compressive element mounted on shaft 22 might be the rotor of a rotary screw compressor (in which case chiller would be a screw chiller).

For a direct drive chiller the rotor 20 of its drive motor 14 is mounted directly to the shaft 22 on which the compressor's impellers are mounted. Drive motor 14 of compressor 10 is structurally strengthened and can be an induction motor which is driven by a variable speed drive 38. Other kinds of variable speed motors are contemplated.

By using the drive 38, a chiller and the compressor 10 of the chiller can operate at lower speeds when the load on a chiller system does not require the operation of the compressor at maximum capacity and at higher speeds when there is an increased demand for chiller capacity. By running compressor 10 and its impellers at lower speeds when the load on the chiller is not high or at its maximum, sufficient refrigeration effect can be provided to cool the reduced heat load in a manner which saves energy, making the chiller more economical from a cost-to-run standpoint and making chiller operation extremely efficient as compared to chillers which are incapable of such load matching. Additionally, compressor 10 may employ inlet guide vanes which, in cooperation with the controlled speed of motor 14, permit very precise control of chiller capacity so that chiller output closely and responsively matches the system load, all while using as little energy as possible and eliminating the need for specially designed drive gears optimized for a specific chiller application, the need for relatively more exotic and expensive variable speed drives and/or motors, or the need for an oil system to provide for the lubrication of bearings and/or a gear train.

The compressor 10 can be a two-stage compressor. The two stage nomenclature indicates that there are two distinct stages of gas compression within the chiller's compressor 10. Such two-stage compression is accomplished by increasing the pressure of the system refrigerant a first time by passing it to, through and past first stage impeller 16 and then by communicating such once-compressed gas to, through and past second stage impeller 17 which increases the pressure of the refrigerant a second time. While compressor 10 is a two-stage compressor in the preferred embodiment, it is to be understood that the present invention is applicable not only to two-stage compressors/chillers but to single stage and other multiple stage chillers as well.

The shaft 22 is supported for rotation in the bearing package 24, which is comprised of a first and a second pressure nitrided stainless steel hybrid bearings 26 and 28 and carries both the thrust load and the majority of the radial load imposed through shaft 22 by the operation of compressor 10. The pressure nitrided stainless steel hybrid bearing 34, which is an axially floating, single angular-contact bearing having a rolling element 36, takes up a relatively small portion of the radial load and-a portion of the thrust load. The pressure nitrided stainless steel hybrid bearing 34 is preloaded in a direction which is opposite the thrust direction of the primary thrust load so as to minimize the net thrust load on the second pressure nitrided stainless steel hybrid bearing 28 which carries the majority of the thrust load.

Figure 1B:
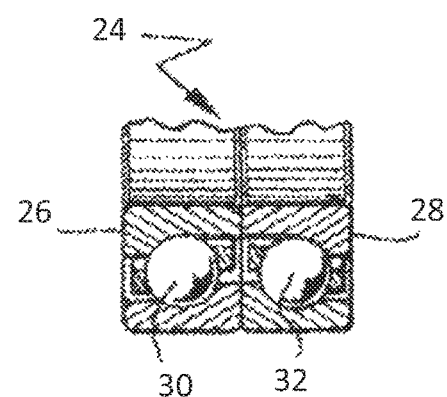
FIG. 1B shows a close-up view of a portion of an embodiment of a bearing package of the compressor shown in FIG. 1A.

The bearing package 24 is disposed approximately halfway down the length of shaft 22 and pressure nitrided stainless steel hybrid bearings 26 and 28 are back-to-back, preloaded, angular-contact rolling element bearings. FIG. 1B shows a close-up view of a portion identified by a circle in FIG. 1A. The rolling elements 30 and 32 of pressure nitrided stainless steel hybrid bearings 26, 28 and the rolling element of the pressure nitrided stainless steel hybrid bearing 34 are preferably balls rather than rollers so as to reduce the cost of the bearings. The pressure nitrided stainless steel hybrid bearings 26 and 28 could, alternatively, be oriented in a face-to-face manner. The races of the pressure nitrided stainless steel hybrid bearings 26 and 28 are oppositely oriented, as shown in FIG. 1B, so as to take up the thrust loads imposed through shaft 22 irrespective of the direction of that thrust load. The pressure nitrided stainless steel hybrid bearing 26 and 28 carry the majority of the radial load imposed through shaft 22.

The impellers 16 and 17 are mounted on shaft 22 on one side of the bearing package 24, and the drive motor rotor 20 is mounted on the other side of the bearing package 24. Bearing package 24 is located along shaft 22 such that a weight of the shaft 22 and impellers 16, 17 on one side of the bearing package 24 balances the weight of the shaft 22 and motor rotor 20 located on the other side of the bearing package 24. The impellers 16, 17 and a portion of the shaft 22 on which they are mounted can be cantilevered and, thus, unsupported at a distal end 42 of the drive shaft 22. The other portion of the drive shaft 22 and the other distal end 44 is radially supported and carried in pressure nitrided stainless steel hybrid bearing 34. It is to be noted that the mounting of shaft 22 in a single pressure nitrided stainless steel hybrid bearing or a single bearing package is possible.

The pressure nitrided stainless steel hybrid bearings 26, 28 of the bearing package 24 are relatively large bore bearings. Their location between drive motor rotor 20 and impellers 16 and 17 permits the diameter of shaft 22 to be large which, together with the bearing radial stiffness that results therefrom, enhances compressor operation by elevating critical speeds so that they are higher than the shaft will see in operation. As such, critical speeds are avoided.

When the bearings are lubricated by a refrigerant (i.e. oil-free), generally, the quality of the lubrication can be described as being "poor," when compared to the bearings being lubricated with oil. This poor lubrication condition results in increased frictional losses that can lead to detriment of both compressor and overall chiller efficiency.

Standard steel hybrid bearings are capable of being lubricated by refrigerant, in the absence of oil. However, those in the art understand that oil is still the preferred lubricant for the standard steel hybrid bearings because in oil-less conditions (i.e. refrigerant lubricated) standard steel hybrid bearings wear out quickly due to the "poor" lubrication of the bearings. For example, a use lifetime of 4000 hours for a bearing in the chiller application is considered to be in a range of a "quick failure rate."

Reasons for the quick failure rate of the standard steel hybrid bearings in a refrigerant lubricated condition (i.e. oil-free condition) has been discovered. The standard steel material of the standard steel hybrid bearings have high impurity content, grain sizes that are too large that physically wear out the bearings under the oil-free condition, and high inclusion in the steel material. Inclusions can include one or more of, but are not limited to, sulfide, alumina, silicate, and globular oxide inclusions. These properties in the material used in traditional steel hybrid bearings contribute to chemical reactivity with the refrigerant and physical deterioration of the steel material. Accordingly, it has been discovered that the grain size, impurity content, and inclusion in the steel material act as stress raisers when the material is used in a hybrid bearing for a compressor for a chiller application that uses refrigerant lubrication (i.e. oil-free).

However, the pressure nitrided stainless steel material used in the bearings described herein has nitrogen concentration greater than 0.3%, carbon concentration between 0.10-0.60%, and chromium concentration between 10-18%.

Further, for example, an embodiment of the pressure nitrided stainless steel material has an ASTM E112 grain size number of 10. An embodiment of the pressure nitrided stainless steel material has an ASTM E112 grain size number range of greater than or equal to 10. An embodiment of the pressure nitrided stainless steel material has an ASTM E112 grain size number range of greater than 10. It is noted that ASTM E112 grain size is determined according to ASTM E112 Standard Test for determining average grain size, as known in the art.

It is noted that an increasing value of the ASTM E112 grain size number means smaller actual grain size in the material. Comparatively, traditional bearing steel materials typically have ASTM E112 grain size numbers in the range of 6 and 8. Accordingly, the grain sizes of traditional steel used in hybrid bearings have much larger grain sizes. The refined grain structure achieved with the pressure nitrided stainless steel results in significant improvements in fatigue performance of the pressure nitrided stainless steel hybrid bearing when used in oil-free conditions.

Further, for example, an embodiment of the pressure nitrided stainless steel material used to make the pressure nitrided stainless steel hybrid bearing is processed to virtually eliminate inclusions. This results in a pressure nitrided stainless steel material that has ultra clean steel microstructure. A comparison of ASTM A295 inclusion ratings for inclusions (e.g. sulfide, alumina, silicate, and "Globular" (globular oxide)) of traditional bearing steels and pressure nitrided stainless steel material examples is below in TABLE 1. Inclusion Rating is a unitless value that is measured in ½ size increments. Inclusion Rating is a measurement of defects in a material. Lower value of the Inclusion Rating is considered to be better. Inclusion means foreign material held mechanically in the steel, and refers to non-metallic particles, such as oxides, sulfides, silicates, etc. Inclusion types include sulfide, alumina, and silicate-type inclusions, globular oxide, etc. Inclusion types can include isolated, relatively nondeformed inclusions with an aspect ratio not in excess of 2:1.

TABLE 1

ASTM A295 Inclusion Ratings

| Type | Traditional Steel Thin Series | Traditional Steel Heavy Series | Pressure Nitrided Stainless Steel Thin Series | Pressure Nitrided Stainless Steel Heavy Series |
|---|---|---|---|---|
| A—Sulfide | 2½ | ½ | ½ | ½ |
| B—Alumina | 2 | 1 | ½ | ½ |
| C—Silicate | ½ | ½ | ½ | ½ |
| D—Globular | 1 | 1 | ½ | ½ |

Further, for example, the chemical resistivity to corrosion and/or chemical reactivity with a refrigerant property has been investigated. Embodiments of pressure nitrided stainless steel material for the pressure nitrided stainless steel hybrid bearing survived 4 hours of ASTM B117/DIN 24021 salt spray testing without an appearance of red rust. In comparison, traditional bearing steel corrode almost instantaneously under the same test conditions.

Embodiments of the pressure nitrided stainless steel hybrid bearing has pressure nitrided stainless steel material that reduces stress raisers (e.g. impurities, grain size, and inclusion). The properties of the pressure nitrided stainless steel material used in forming the pressure nitrided stainless steel hybrid bearing provide a substantial increase in the useful lifetime of the bearings used in oil-free conditions. As stated above, traditional steel hybrid bearings can last about 4,000 hours of use. In contrast, embodiments of pressure nitrided stainless steel hybrid bearings can last 25,000 hours or longer. An embodiment of pressure nitrided stainless steel hybrid bearing can last 25,000 hours to 35,000 hours. An embodiment of pressure nitrided stainless steel hybrid bearing can last 35,000 hours or longer.

Figure 2:
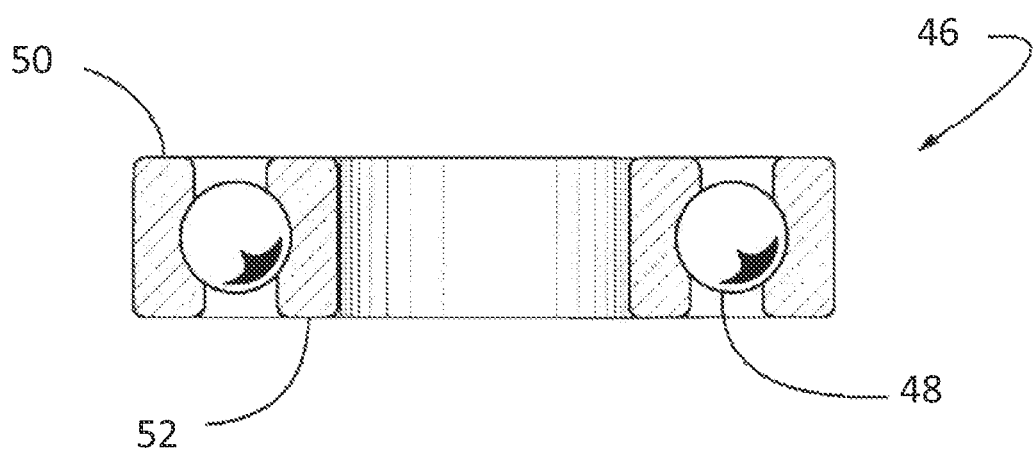
FIG. 2 shows a cutaway side view of an embodiment of a pressure nitrided stainless steel hybrid bearing.

FIG. 2 shows a cutaway side view of an embodiment of a pressure nitrided stainless steel hybrid bearing 46, which corresponds to the pressure nitrided stainless steel hybrid bearings 26, 28, and/or 34. The pressure nitrided stainless steel hybrid bearing 46 includes a plurality of ceramic rolling elements 48 (which may be, for example, round, cylindrical, conical, spherical, barrel-shaped, needle-shaped, etc.) interposed between an outer race 50 and an inner race 52. The ceramic rolling elements 48 correspond to rolling elements 30, 32 and 36. The bearing races 50, 52 are formed of a pressure nitrided stainless steel material. The ceramic rolling elements 48 can be made of silicon nitride. The ceramic rolling elements 48 can have on the order of 60% less density, can have a modulus of elasticity up to 50% higher, can thermally expand only 30% as much as steel bearings and can have a coefficient of friction on the order of 20% of that of rolling elements fabricated from steel.

An example method of producing the pressure nitrided stainless steel includes vacuum induction melting, vacuum arc remelting, electroslag remelting, and pressurized electroslag remelting. This process eliminates detrimental eutectic carbides, refines the grain structure, virtually eliminates inclusions. The resulting steel material significantly improves corrosion resistance, compressive strength, and toughness properties.

Preferred embodiments have been described. Those skilled in the art will appreciate that various modifications and substitutions are possible, without departing from the scope of the invention as claimed and disclosed, including the full scope of equivalents thereof.

Aspects:

It is noted that any of the features in any of the aspects below can be combined with any of the other aspects.

1. A hybrid bearing, comprising:
a race made from a pressure nitrided stainless steel, wherein the pressure nitrided stainless steel has nitrogen concentration range of equal to or greater than 0.3%, carbon concentration range of 0.10-0.60%, and chromium concentration range of 10-18%.

2. A hybrid bearing, comprising:
a race made from a pressure nitrided stainless steel, wherein the pressure nitrided stainless steel has nitrogen concentration range of greater than 0.1%, carbon concentration range of 0.10-0.60%, and chromium concentration range of 12-18%.

3. The hybrid bearing according to any of the aspects 1-2, wherein the pressure nitrided stainless steel has an ASTM E112 grain size number range having a value of equal to or greater than 10.

4. The hybrid bearing according to any of the aspects 1-3, wherein the pressure nitrided stainless steel having an ASTM A295 inclusion rating for sulfide of equal to or less than ½.

5. The hybrid bearing according to any of the aspects 1-4, wherein the pressure nitrided stainless steel having an ASTM A295 inclusion rating for alumina of equal to or less than ½.

6. The hybrid bearing according to any of the aspects 1-5, wherein the pressure nitrided stainless steel having an ASTM A295 inclusion rating for silicate of equal to or less than ½.

7. The hybrid bearing according to any of the aspects 1-6, wherein the pressure nitrided stainless steel having an ASTM A295 inclusion rating for globular oxide of equal to or less than ½.

8. A compressor, comprising:
the hybrid bearing according to any of the aspects 1-7.

What is claimed is:

1. A compressor for a refrigerant system, comprising:
first and second hybrid bearings, each of the first and the second hybrid bearings including a race made from a pressure nitrided stainless steel, wherein the pressure nitrided stainless steel has a nitrogen concentration range of equal to or greater than 0.3 wt. %, a carbon concentration range of 0.10-0.60 wt. %, and a chromium concentration range of 10-18 wt. %;
a shaft supported by both of the first and the second hybrid bearings, such that when in normal operation of the compressor, the first and the second hybrid bearings carry a thrust load and a majority of a radial load imposed through the shaft; and
a refrigerant lubricant disposed at the first and the second hybrid bearing bearings to lubricate the first and the second hybrid bearings, wherein the refrigerant lubricant is not oil.

2. The compressor according to claim 1, wherein there is no oil disposed at the first and the second hybrid bearings.

3. The compressor according to claim 1, wherein the refrigerant lubricant is a fluid which is compressed by the compressor.

4. The compressor according to claim 1, wherein the first and the second hybrid bearings are in a centrifugal compressor of a centrifugal chiller.

5. A method of using first and a second hybrid bearings as a support for a rotating shaft of a compressor of a refrigerant system during normal operation, each of the first and the second hybrid bearings having a race made from a pressure nitrided stainless steel, wherein the pressure nitrided stainless steel has a nitrogen concentration range of equal to or greater than 0.3 wt. %, a carbon concentration range of 0.10-0.60 wt. %, and a chromium concentration range of 10-18 wt. %, the method comprising:

lubricating the first and the second hybrid bearings with a refrigerant lubricant, wherein the refrigerant lubricant is not oil; and carrying a thrust load and a majority of a radial load imposed through the rotating shaft via both of the first and the second hybrid bearings when in normal operation of the compressor.

6. The method according to claim 5, wherein the lubricating is performed in the absence of oil at the first and the second hybrid bearings.

7. The method according to claim 5, wherein the compressor is a centrifugal compressor in a centrifugal chiller.

8. The method according to claim 5, further comprising compressing the refrigerant lubricant performed by the compressor.

9. The method according to claim 5, further comprising directing flow of the refrigerant lubricant to the first and the second hybrid bearings.

10. The method according to claim 5, wherein the pressure nitrided stainless steel of the race has a ASTM E112 grain size number value of equal to or greater than 10.

11. The method according to claim 5, wherein the pressure nitrided stainless steel of the race has ASTM A295 inclusion rating(s) for one or more of:

sulfide of equal to or less than ½, alumina of equal to or less than ½, silicate of equal to or less than ½, and globular oxide of equal to or less than ½.

\* \* \* \* \*